US007953174B2

(12) United States Patent
Asbeck et al.

(10) Patent No.: US 7,953,174 B2

(45) Date of Patent: May 31, 2011

(54) RADIO TRANSMISSION FREQUENCY DIGITAL SIGNAL GENERATION

(75) Inventors: Peter M. Asbeck, San Diego, CA (US); Ian Galton, Del Mar, CA (US)

(73) Assignee: The Regents of the University of California, Oakland, CA (US)

(*) Notice: Subject to any disclaimer, the term of this patent is extended or adjusted under 35 U.S.C. 154(b) by 1437 days.

(21) Appl. No.: 10/392,290

(22) Filed: Mar. 19, 2003

(65) Prior Publication Data

US 2003/0210746 A1 Nov. 13, 2003

Related U.S. Application Data

(60) Provisional application No. 60/365,983, filed on Mar. 20, 2002.

(51) Int. Cl.
*H04L 27/00* (2006.01)

(52) U.S. Cl. ........................................ 375/295; 375/307

(58) Field of Classification Search .................. 375/295, 375/297, 307; 455/74, 86, 88, 552.1, 114.2
See application file for complete search history.

(56) References Cited

U.S. PATENT DOCUMENTS 5,469,475 A * 11/1995 Voorman ...................... 375/247
6,317,468 B1 * 11/2001 Meyer ........................... 375/269
6,339,621 B1 * 1/2002 Cojocaru et al. .............. 375/247
6,498,819 B1 * 12/2002 Martin .......................... 375/345
6,611,565 B1 * 8/2003 Bada et al. .................... 375/295
6,744,825 B1 * 6/2004 Rimstad et al. ............... 375/298
6,982,593 B2 * 1/2006 Robinson et al. ............... 330/10
2001/0017893 A1 * 8/2001 Do et al. ....................... 375/247
2002/0067772 A1 * 6/2002 Shepperd et al. ............. 375/308
2002/0097085 A1 * 7/2002 Stapleton ........................ 330/10
2003/0021367 A1 * 1/2003 Smith ........................... 375/346
2003/0035493 A1 * 2/2003 Mollenkopf .................. 375/295
2003/0053551 A1 * 3/2003 McNeely ....................... 375/295
2004/0001463 A1 * 1/2004 Kotzin .......................... 370/335
2004/0037363 A1 * 2/2004 Norsworthy et al. ......... 375/259

OTHER PUBLICATIONS

Keyzer et al, Digital Generation of RF Signals for Wireless Communications with Band-Pass Delta-Sigma Modulation, May 2001, IEEE MTT-S Digest, p. 2127-2130.*
Iwamoto et al., "Bandpass Delta-Sigma Class-S Amplifier", Electronics Letters, vol. 36, No. 12 (2000).
Jayaraman et al., "Linear High-Efficiency Microwave Power Amplifiers Using Bandpass Delta-Sigma Modulators", IEEE and Guided Letters, vol. 8, No. 3 (1998).
Stapleton, S.P., "High-Efficiency Switching Mode Power Amplifiers Using Bandpass Delta-Sigma Modulators", Agilent EEsof Design Seminar, Sep. 2006.
J. Keyzer et al., "Digital Generation of RF Signals for Wireless Communications with Band-Pass Delta-Sigma Modulation", IEEE MTT-S Digest, 2001, pp. 2127-30; (Symposium Phoeniz, AZ, May 20-25, 2001).

* cited by examiner

*Primary Examiner* — Chieh M. Fan
*Assistant Examiner* — Freshteh N Aghdam
(74) *Attorney, Agent, or Firm* — Greer, Burns & Crain Ltd.

(57) ABSTRACT

The invention is directed to digital generation of RF signals. In the digital domain, digital RF signals are converted to the digital signals clocked at a high speed clock that is phase-synchronized with the RF carrier. A band-pass delta-sigma modulator produces a bit stream from the converted digital signals.

26 Claims, 8 Drawing Sheets

RADIO TRANSMISSION FREQUENCY DIGITAL SIGNAL GENERATION

RELATED APPLICATION REFERENCE AND PRIORITY CLAIM

This invention is related to provisional application Ser. No. 60/365,983 filed on Mar. 20, 2002. Priority is claimed from that provisional application under 35 U.S.C. §119.

FIELD OF THE INVENTION

The field of the invention is wireless communications. The invention specifically concerns wireless transmitters, e.g., CDMA (code division multiple access) transmitters.

BACKGROUND OF THE INVENTION

The modern and future model for wireless data communication is the transmission of digital signals. The microwave radio frequency (RF) medium for carrying digital signals, however, remains analog. This presents some difficulties that remain a subject of continuing efforts to improve transmitter technology. Thus, while signal processing circuitry is often advantageously implemented in CMOS technology, wireless devices also typically include analog circuitry for encoding digital signals for transmission.

Transmitters thus remain an implementation conducted with analog circuits. Transmitters implemented with analog and RF electronics typically include a variety of functions. In many cases, the in-phase (I) and quadrature (Q) baseband signals are computed at baseband frequencies with digital signal processing (DSP), and subsequently converted to the analog domain with digital-to-analog converters (DACs) of moderate resolution (4-12 bits). The signals are subsequently up converted to RF, often via an intermediate frequency stage, using quadrature mixers and filters. A variable gain stage is often included. Finally, the transmitter typically comprises a power amplifier and an output coupler.

Due to the involved frequencies and the amount of data, the DAC implementations remain quite complex. Conventional digital transmitters and receivers require very high-speed digital-to-analog converters with high resolution. There accordingly remains a need in the art for improved encoding of data to wireless RF signals.

SUMMARY OF THE INVENTION

The invention is directed to digital generation of RF signals. In the digital domain, digital RF signals are up converted to digital signals clocked at a high speed clock that is phase-synchronized with the RF carrier. A band-pass delta-sigma modulator produces a bit stream from the converted digital signals.

DETAILED DESCRIPTION OF THE PREFERRED EMBODIMENTS

The invention is directed to digital generation of RF signals. In the digital domain, digital RF signals are up converted to digital signals clocked at a high speed clock, which is phase-synchronized with the carrier for the transmission of the RF signals. Preferably, the high speed clock is a multiple of the RF carrier frequency. A band-pass delta-sigma modulator produces a bit stream from the converted digital signals. The need for high resolution and high speed DAC converters is avoided by the invention. A bit stream, preferably of 1-bit resolution, including the required analog transmission spectrum, is provided by a band-pass delta-sigma (BPDS) modulator. The BPDS output may then be applied to an amplifier and filter. In preferred embodiment transmitters of the invention, the bit stream to drive the amplifier is provided from an integrated CMOS circuit. In such preferred embodiments, the input for a transmitter amplifier is therefore produced from an integrated digital signal processing circuit.

The invention therefore offers the opportunity to move more of the transmitter architecture into a CMOS integration. CMOS performance continues to increase, while its cost, in terms of power dissipation and circuit area, drops. It has been predicted that CMOS performance will reach clock rates of 3.5 GHz in 2005. While current CMOS performance adequately permits utilization of the invention, increases in CMOS performance will create even more powerful embodiments of the invention in the near future, as devices of the invention take full advantage of increasing clock rates for CMOS DSP implementations.

Figure 1:
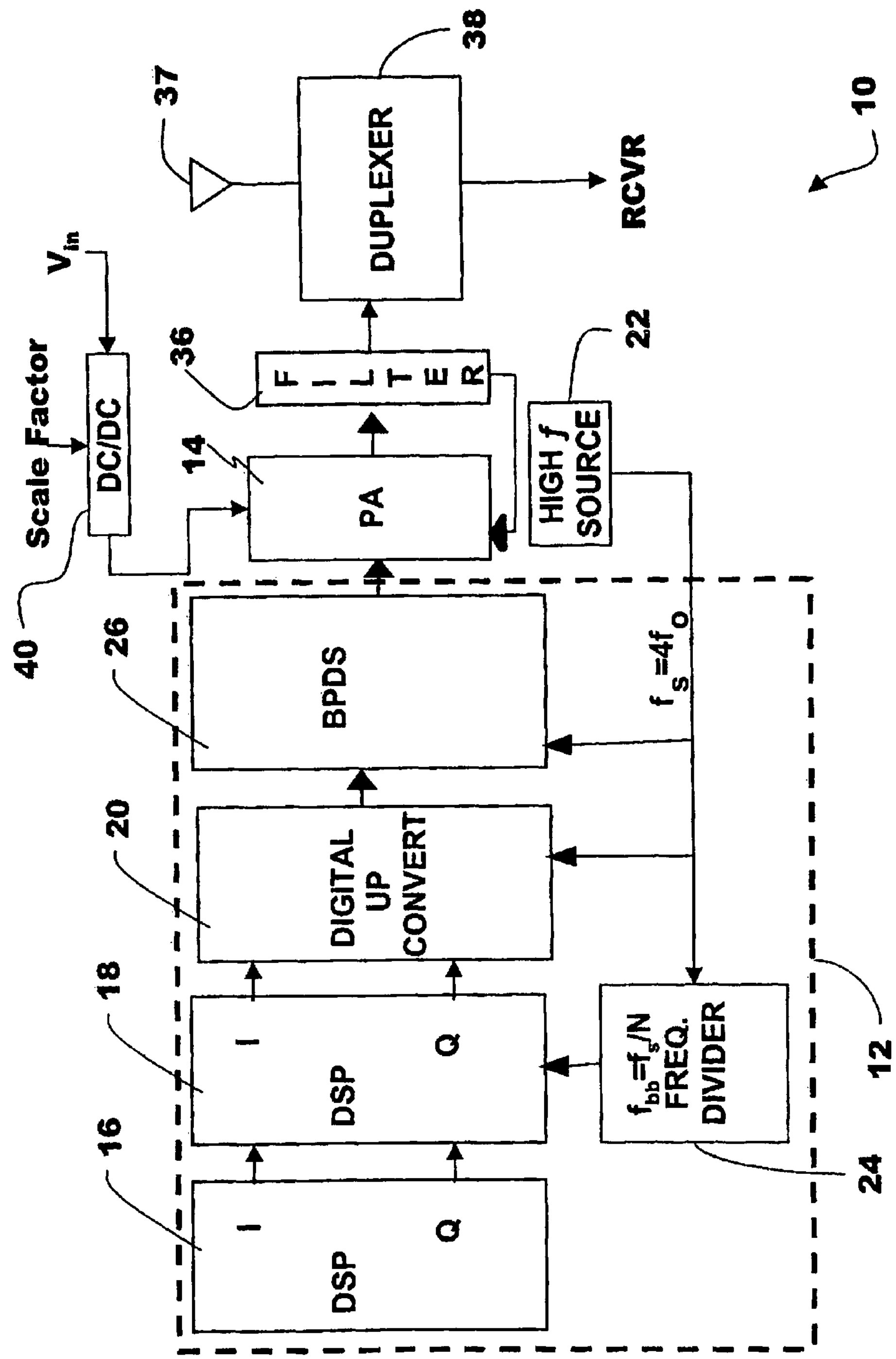
FIG. 1 is a block diagram of a preferred embodiment RF wireless transmitter.

Referring now to FIG. 1 a preferred embodiment RF transmitter 10 is shown. A primary portion of the preferred transmitter 10 is realized as an integrated circuit 12, the output of which is a bit stream including analog information necessary to drive an amplifier 14. Within the integrated circuit 12, a conventional digital signal processor (DSP) 16 provides in-phase (I) and quadrature (Q) signals including data for transmission. Completely within the digital domain, the integrated circuit 12 (preferably CMOS) computes a BPDS encoded, up converted version of the signals contained in the I and Q digital data streams provided by the conventional DSP 16. The resultant output signal may be directly applied to the power amplifier 14. In the preferred embodiment transmitter 10, the power amplifier 14 is a switching power amplifier that accepts a binary bit stream as an input and outputs an amplified analog signal.

In the integrated circuit 12, the high speed clock (preferably at a multiple of the carrier frequency $f_o$) is utilized during the conversion of the I and Q signals outputted from the conventional DSP 16 at a processing circuit frequency. The DSP 16 operates at baseband, i.e., it has a clock rate or sample rate that is of the same order as the modulation. As an example, for CDMA, the modulation has 1.22 MHz bandwidth, and typically the DSP operates with 5 MHz clock rate. By contrast, a typical RF carrier frequency for CDMA is in a band from ~824-849 MHz.

An additional DSP 18 performs a timing adjustment to begin the transition to the high speed clocking. A digital up converter 20 up converts the I and Q signals to the highest clock rate (defined as $f_s$) utilized by the integrated circuit 12. For a desired output carrier frequency $f_o$, the clock rate $f_s$ is selected to correspond to a multiple of $f_o$, e.g., $f_s=4f_o$, to simplify computations. The carrier frequency $f_o$ is obtained from a high frequency RF transmission clock source 22 (e.g., a phase lock loop) such as is conventionally used to generate a set of carrier frequencies in RF transmitters. The high frequency source 22 provides the selected multiple $f_s$ to the integrated circuit 12. However, in the transmitter 10 the output of the high frequency source 22 is not mixed with the I and Q signals for transmission. Instead, the frequency provided by the high frequency source 22 is used as a basis to clock a digital domain conversion of the I and Q signals from the DSP 16 to the bit stream that drives the power amplifier 14.

The DSP 16 used to generate the I and Q signals at baseband does not operate with a clock that is compatible with the high frequency output clock $f_s$, a conversion of clock rates must be carried out. This is accomplished most easily at the lowest possible clock rates. Ideally, the digital up converter 20 implements the operation:

$$y(t)=x_i(t)\sin(2\pi f_o t)+x_q(t)\cos(2\pi f_o t) \quad (1)$$

where $x_i(t)$ and $x_q(t)$ are the analog I and Q channel signals. In the transmitter 10, digital versions of the I and Q channel signals are provided by samples at a frequency $f_{bb}$ from the DSP 18. The frequency $f_{bb}$ is provided by a frequency divider 24 and is an exact submultiple of $f_s$. The frequency $f_{bb}$ used by the DSP 18 is preferably chosen to be higher than the desired signal bandwidth by a factor of at least 10 to 40. DSP 18 operates with a clock rate that is in the neighborhood of the clock rate used in DSP 16, but one which is an exact submultiple of the frequency $f_s$. DSP 18 contains a digital domain filter that is used to eliminate spurious frequencies produced by the clock rate conversion. As an alternative, the input stages of DSP 18 may operate with a low clock rate $f_{bb1}$ higher than the desired signal bandwidth by only a factor of 2 to 4, and use for subsequent stages (which carry out filtering) a clock rate $f_{bb2}$ which is an exact multiple of $f_{bb1}$, and an exact submultiple of $f_s$, chosen to be 10 to 40 times higher than the signal bandwidth.

The preferred digital operation performed by the digital up converter 20 to achieve the result implied by the ideal analog domain equation (1) is:

$$y(n)=x_i(n)s_1(n)+x_q(n)s_2(n) \quad (2)$$

where $s_1(n)$ is the signal $\{1,1,-1,-1, \ldots\}$ and $s_2(n)$ is the signal $\{-1,1,1,-1 \ldots\}$, $x_i(n)$ is an in-phase component of the RF signal provided by the DSP 18, and $x_q(n)$ is a quadrature component of the RF signal provided by the DSP 18. An alternate acceptable is the sequence where $s_1(n)$ is the signal $\{1,0,-1,0,1,0 \ldots\}$ and $s_2(n)$ is the signal $\{0,1,0,-1,0,1 \ldots\}$. The up converter operation is simplified by use of an appropriate multiple of the high frequency RF transmission clock, e.g., $f_s=4\ f_o$.

Figure 2:
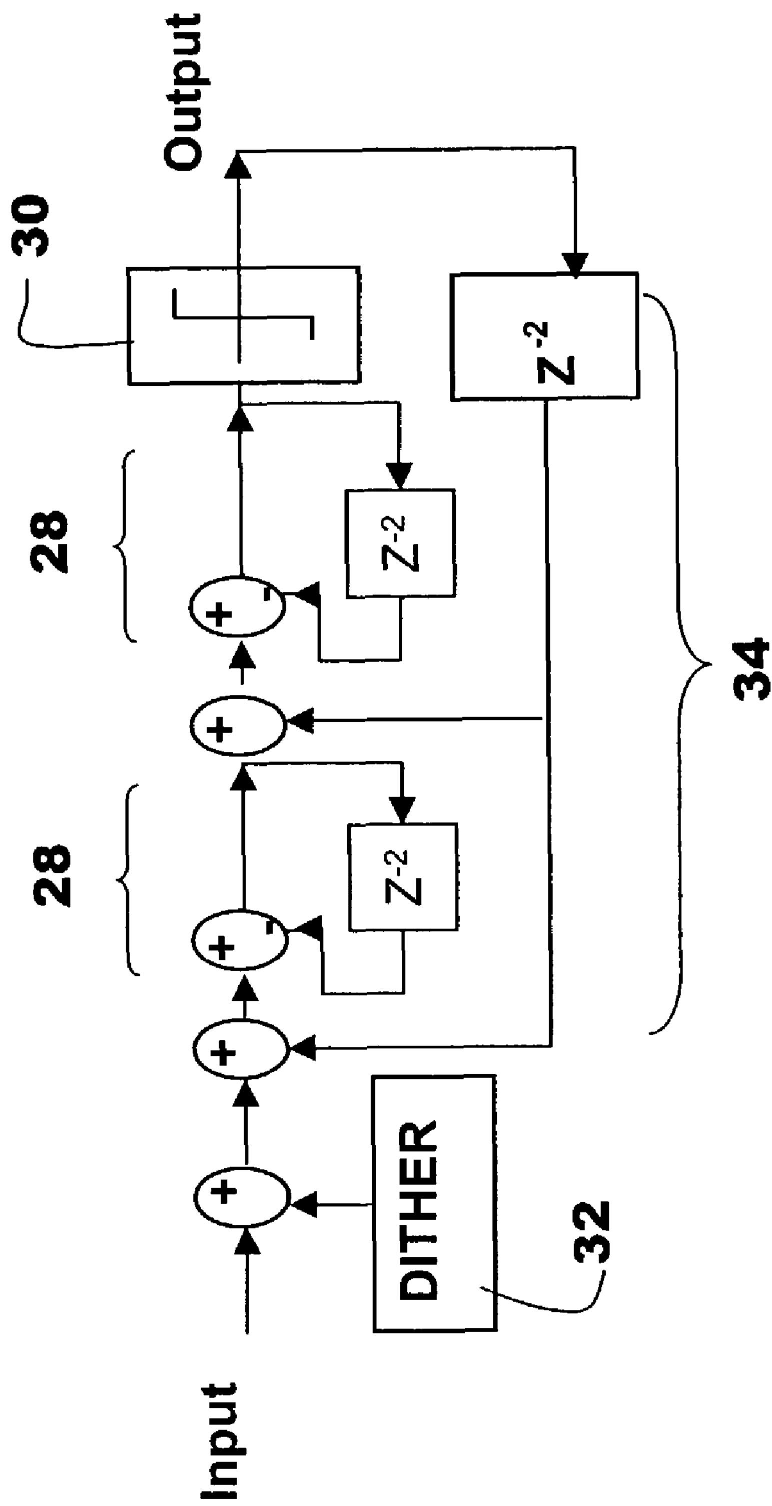
FIG. 2 is a block diagram of a preferred embodiment band-pass delta-sigma modulator.

The resultant signals from the digital up converter 20 are then passed into a digital band-pass delta-sigma (BPDS) modulator 26. An exemplary preferred BPDS is shown in FIG. 2.

The BPDS modulator 26 comprises one or more digital resonators 28 that delay signals by a fixed number of clock signals, e.g., 2, and then subtract the signal from itself. A single-bit quantizer 30 determines the output of the BPDS modulator 26. A dither source 32 provides a pseudo random variation of the least significant bit of the input to the BPDS modulator to remove spurious frequencies and instabilities from the output. A feedback loop 34 feeds back the output bit. The resonators 28 may be implemented in a variety of ways, but a particularly simple realization takes advantage of the fact that the center frequency ($f_c$) of the resonator is $f_o=f_c/4$. Where the preferred multiple $f_s=4\ f_o$ is used, the up conversion and BPDS operations can therefore be carried out without multiplies in the digital operations.

An example will now be discussed for the purpose of understanding only, and not limitation. With the preferred value of $f_s=4\ f_o$, if DSP 16 operates at 5.0000 MHz, and $f_o$=848 MHz, then $f_s$=4×848 MHz=3392 MHz. The clock rate of DSP 18 could then be set to be 3392 MHz/672=5.0476 MHz (although there are other possible choices). The clock rate might also be selected as a multiple of that value, e.g., the clock rate of DSP 18 might be set to be (3392 MHz/672) x2=10.0952 MHz, (3392 MHz/672)x4=20.1904 MHz, or (3392 MHz/672) x8=40.3809 MHz. These frequencies are all submultiples of $f_s$=3392 MHz. The filtering done within the final stages of DSP 18 should preferably done at a frequency of 40.3809 MHz=(3392 MHz/672)x8=(3392 MHz/84).

The output of the BPDS 26 will include out of band components. In FIG. 1, the out of band components are removed after the switching power amplifier 14 by an analog output filter 36. The analog output filter 36 removes undesired spectral components from the output, and preferably recycles power associated with those components back to the switching power amplifier 14, so that the undesired spectral components do not increase power consumption. The filtered output is suitable for broadcast, e.g., through an antenna 37 by a conventional duplexer 38. The duplexer permits the antenna 37 to be shared with a receiver (unshown). Other standard transmitter/receiver components may be used as well, e.g., an isolator to eliminate the effect of power reflections.

To achieve high dynamic range for the transmitter output prior to the BPDS modulation, the I and Q signals may be scaled such that their peak values are of the order of the maximum input swing appropriate for the BPDS modulator 26. The scaling may be a function of the DSP 18. The output of the switching mode power amplifier 14 can be modulated by the resulting scaling factor via control of a transmitter power supply voltage with a digitally controlled dc-dc converter 40.

The embodiment of the BPDS shown in FIG. 2 is a single-bit output BPDS, but the invention is not limited thereto. BPDS modulators with more than 1 bit output may also be used. For example, an output consisting of clocked signals that can have the values {1,0,−1} can also be used. This is typically referred to as 1½ bits output of the delta-sigma modulator. An alternative could be a 2 bit output (with clocked signals that can have the values {0,1} on either of two separate output signal lines). The use of these digital signals with more than one bit can decrease the amount of noise generated by the band-pass delta-sigma modulator that must be filtered out of the signal. In the FIG. 1 embodiment, the switching amplifier 14 must accept the bit resolution output by the BPDS. Thus, a two-bit resolution BPDS requires a two bit switching amplifier, for example. Alternate embodiments of the invention also include analog amplification.

Figure 3:
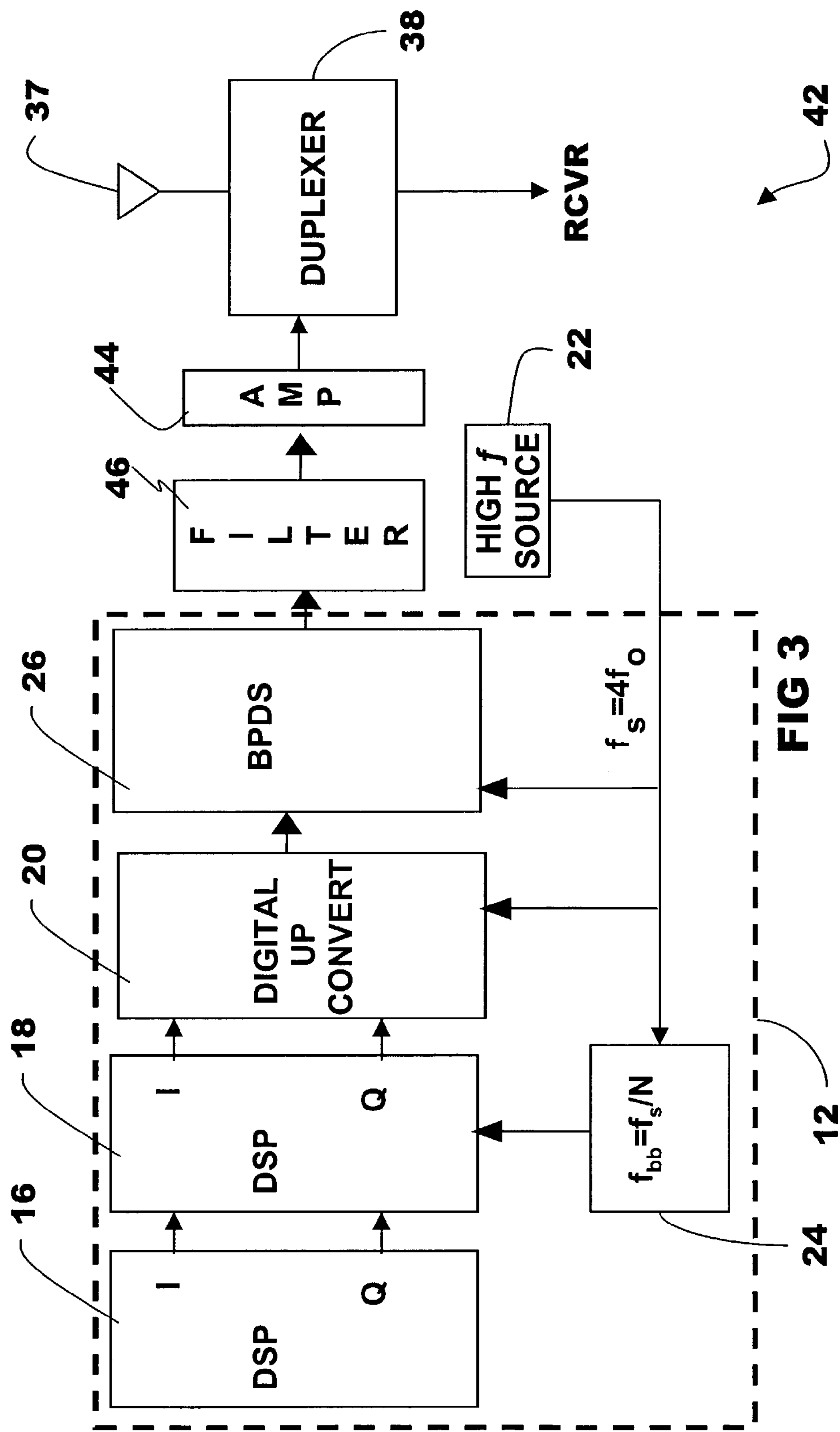
FIG. 3 is a block diagram of another preferred embodiment RF wireless transmitter.

Another preferred embodiment transmitter 42 is shown in FIG. 3. It is a variation of the FIG. 1 preferred embodiment transmitter 10, and reference numerals from FIG. 1 are used to indicate like parts. In the transmitter 42 an analog amplifier 44 is used instead of an amplifier that responds to the digital output bits of the BPDS 26 directly. An example analog amplifier is a Class AB amplifier, typically used in wireless handsets. A filter 46 removes out of band noise, and also produces an analog representation of the information provided in the bit stream output from the BPDS 26.

Figure 4:
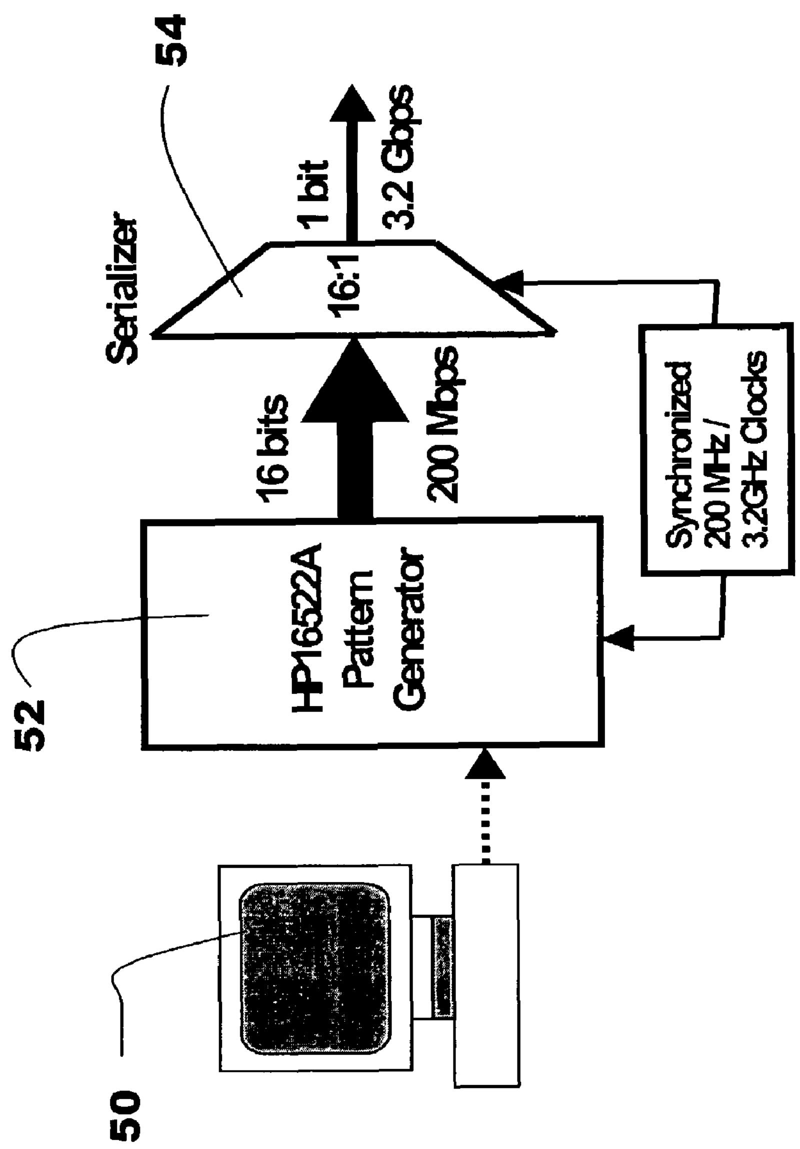
FIG. 4 is a block diagram of an experimental test set up.
Figure 5:
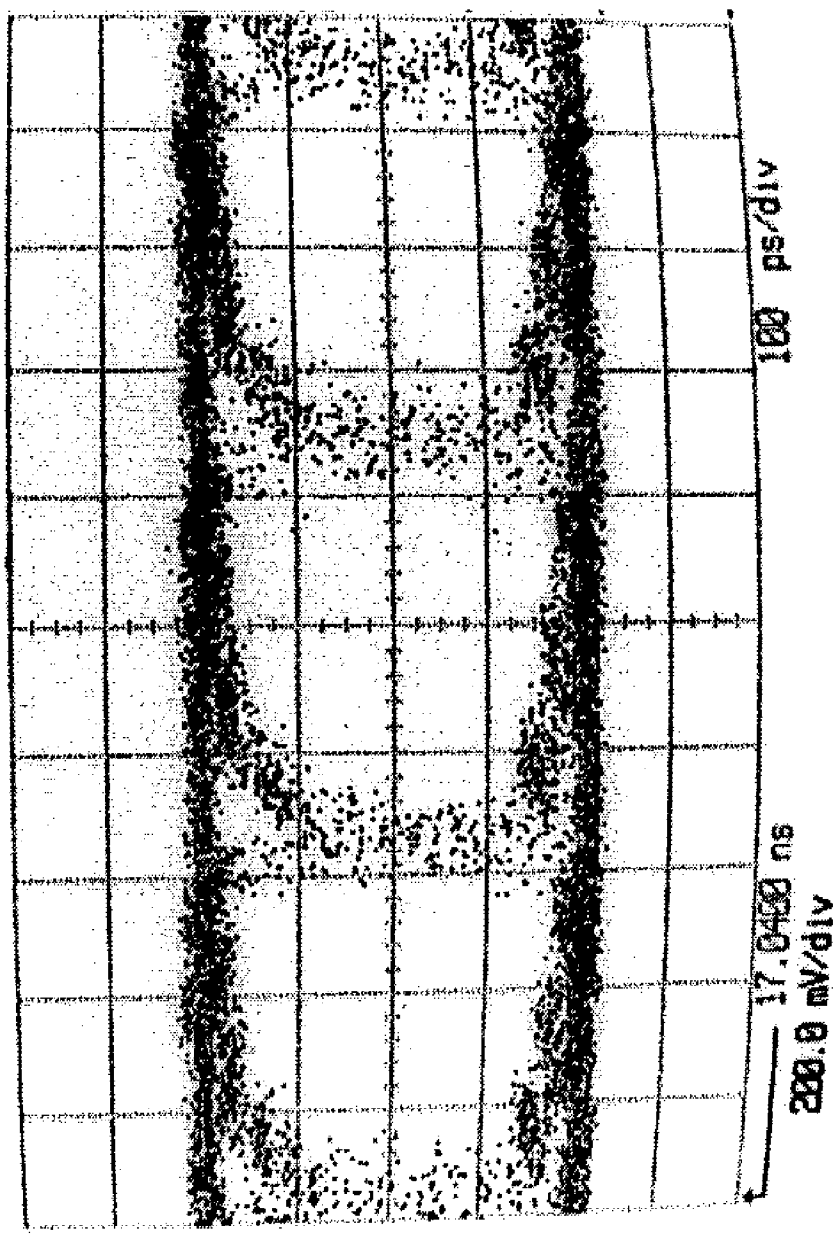
FIG. 5 is a representative eye diagram from the experimental test set up of FIG. 3.

Experiments were conducted to simulate performance of embodiments of the invention in accordance with FIGS. 1 and 2. A block diagram of the experimental system is shown in FIG. 4. For the purpose of the experiment, a computer-generated bit stream was computed (using MATLAB) on a computer and stored in a logic analyzer/pattern generator as a representation of digital bit signals encoding wireless communications signals by computer 50 and pattern generator 52. The digital signals could be read out (in a repetitive fashion) at a rate of up to (and beyond) 200 Mb/S per channel (limited by the capabilities of the logic analyzer/pattern generator 52, which was clocked by high frequency clock signals). In order to demonstrate signals in the cellular band, a digital 16:1 serializer 54 was used to combine the data of 16 separate channels. The serializer used was a Conexant CX60061 chip implemented in GaAs HBT technology. The serializer output was a digital signal at 3.6 Gb/S. A representative eye diagram is shown in FIG. 5 for output digital signals (100 pS per division) from the serializer 54.

Figure 6:
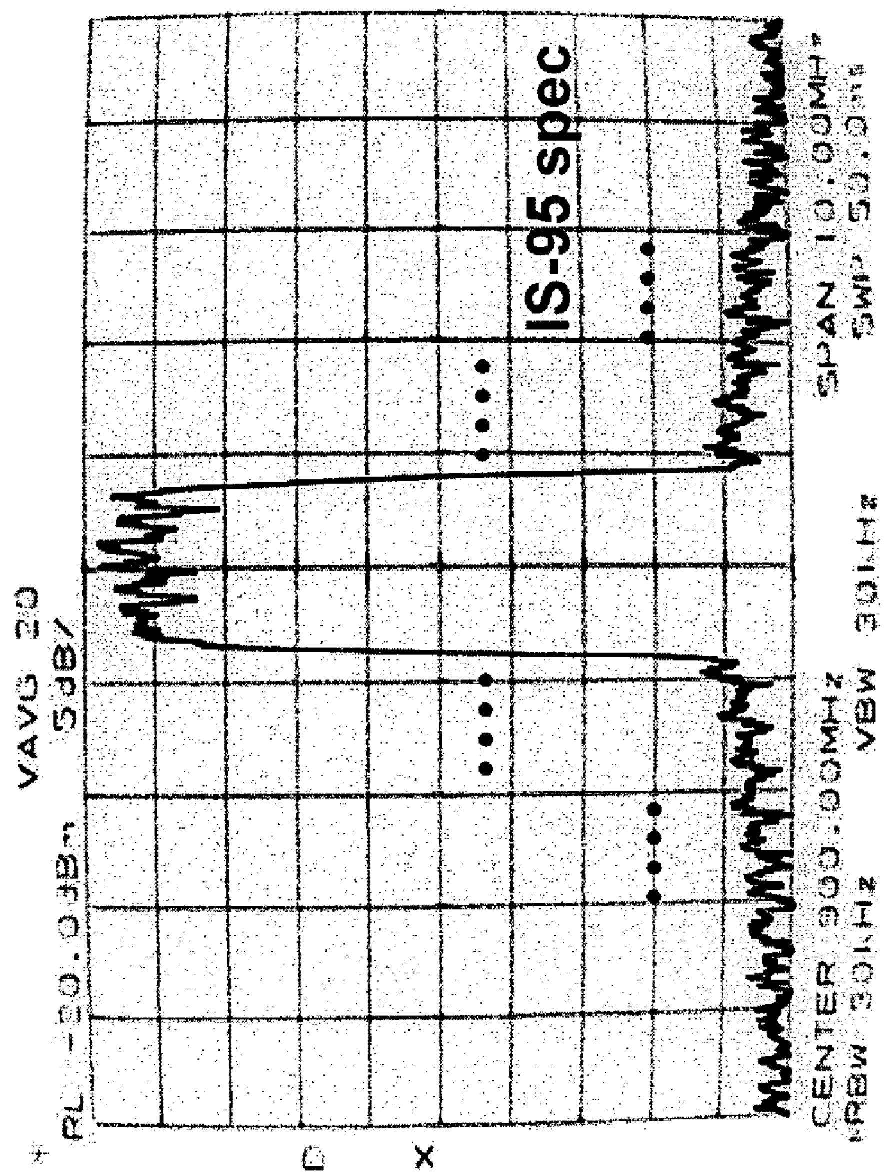
FIG. 6 is the frequency spectrum measured from an exemplary output from the experimental test set-up of FIG. 4.
Figure 7:
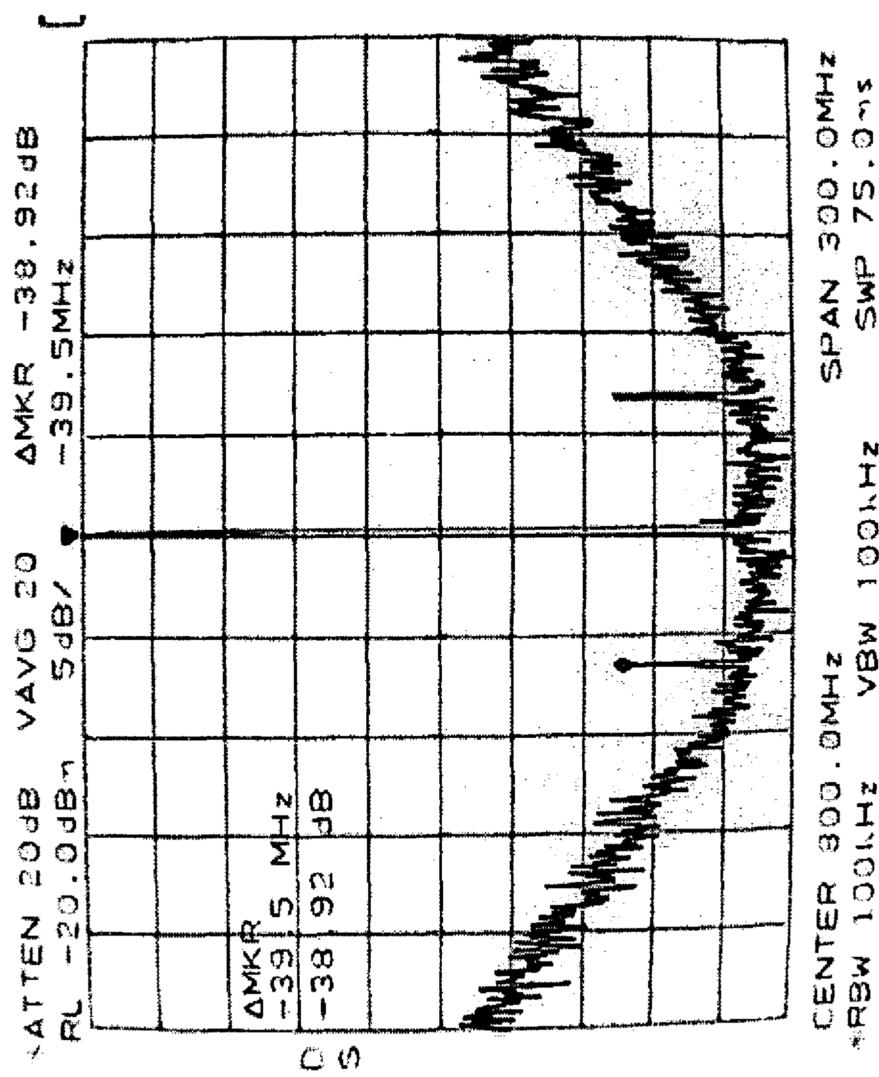
FIG. 7 shows the same signal as FIG. 6, measured over a broader frequency range.

After programming the logic analyzer/pattern generator 52 with an appropriate dataset corresponding to a CDMA IS-95 signal, the output data stream was measured with a spectrum analyzer. FIG. 6 shows representative results, on a fine-grained frequency resolution (output digital signals at 100 pS per division, span 10 MHz, 5 dB/div vertical scale. The limits for adjacent and alternate channel power for IS-95 signals are also shown). The CDMA output signal is visible in FIG. 6, and the background noise in the cellular band is low. The figure shows schematically the limits on spurious power for the transmitter in the adjacent and alternate channels imposed by the IS-95 specifications. The digital signal is well within the bounds of the specification. FIG. 7 shows the same signal as FIG. 6 over a broader frequency range (a span of 100 MHz). The quantization noise can be seen to increase away from the center frequency, as expected from the noise shaping process. Also visible are two peaks that correspond to incompletely suppressed images of the data signal produced during the up conversion process. The out of band noise can be suppressed from the output by passive analog filtering.

Figure 8:
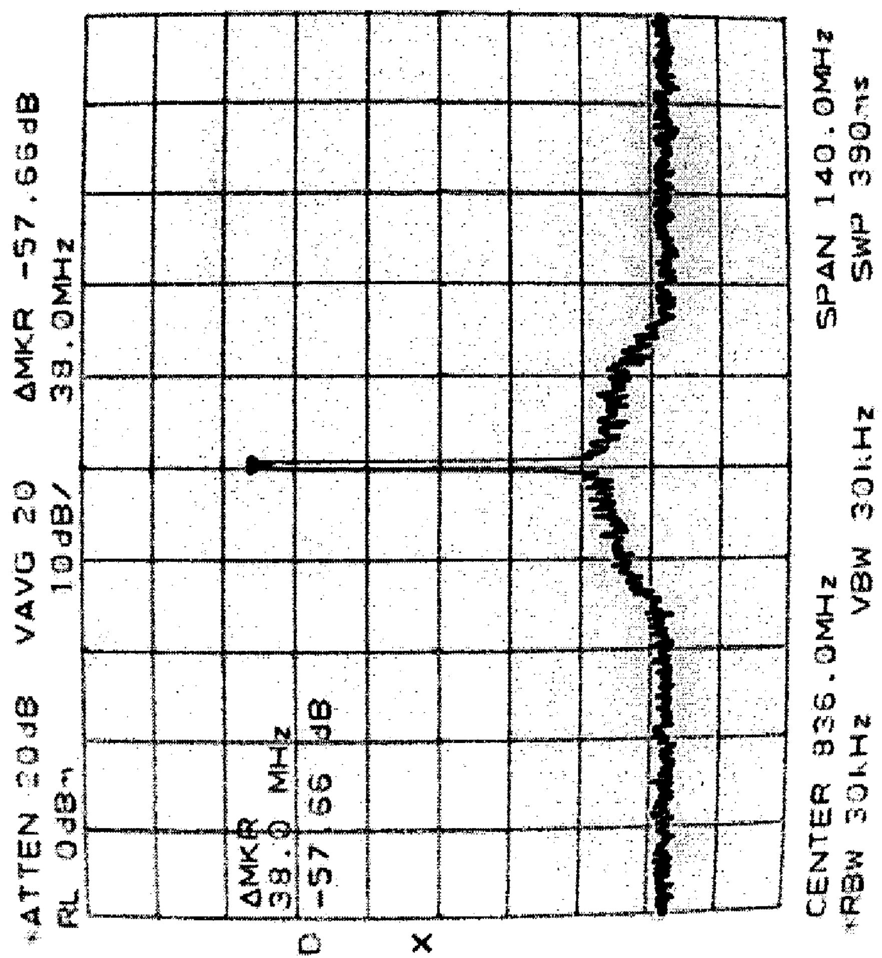
FIG. 8 shows the FIGS. 6 and 7 signal subsequent to filtering.

As described with respect to the preferred embodiments, the goal is to recycle the majority of the out of band power, so that it does not degrade the overall power efficiency of the system. One of the important challenges in filtering is the removal of spurious power from the channels corresponding to the receiver for the case of FDD (frequency division duplex) systems, in which the transmitter and receiver simultaneously operate. To address such a case, the filtering should have sharp characteristics (such as the ceramic filters used in present CDMA technology). FIG. 8 shows the output spectrum of FIG. 7 after passing the signal through a Toko four pole dielectric filter. As seen in FIG. 8, the noise floor of the spectrum analyzer masks the filter suppressed quantization noise in the receive band.

The exemplary results show the efficacy of the invention. Many benefits will be apparent to artisans. The increased integration of the transmitter offers potential advantages of minimizing component drift and need for adjustment, lower part count and size, and easier assembly. The use of band-pass delta-sigma signals eliminates the need for a high resolution DAC, and enables the use of switching mode amplifiers, which have the potential for increasing efficiency. Various band-pass delta-sigma algorithms may be used with the invention, and many are capable of achieving microwave signals using clocked binary signals (digital data streams) with good fidelity over a specified frequency band.

Artisans will recognize many additional benefits of the invention, and many additional embodiments will be apparent to those skilled in the art. By way of further example, the use of the digital domain processing for RF transmitter functions will alleviate many typical problems, such as those associated with tuning requirements and aging. A higher level of integration and smaller size are obtained. Moving more of the transmitter function into the CMOS integration (as in preferred embodiments) provides numerous new opportunities for innovation in the areas of architectures, circuit functions and signal formats. Complicated modulation approaches can be implemented, and changed may be made as needed via straightforward reconfiguration of the timing adjustment. In preferred embodiments, the timing adjustment DSP can be responsive to the RF channel, e.g., accounting for impairments in the RF channel in response to sensors that monitor the RF channel condition.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for digital generation of RF signals, the method comprising:

timing adjusting digital RF signals produced by a digital circuit to a first frequency phase-synchronized to an RF transmission frequency;

up converting the timing adjusted digital RF signals to a second frequency that is a multiple of the RF transmission frequency; and band-pass delta-sigma modulating the up converted timing adjusted digital RF signals to produce an output bit stream.

2. The method of claim 1, wherein the first frequency is a substantially integral sub-multiple of the second frequency.

3. The method of claim 2, wherein the second frequency is four times the RF transmission frequency.

4. The method of claim 2, wherein the first frequency is higher than a bandwidth for transmission of the RF signals.

5. A method for digital generation of RF signals, the method comprising:

timing adjusting digital RF signals produced by a digital circuit to a first frequency phase-synchronized to an RF transmission frequency;

up converting the timing adjusted digital RF signals to a second frequency that is a multiple of the RF transmission frequency; and band-pass delta-sigma modulating the up converted timing adjusted digital RF signals to produce an output bit stream;

wherein said up converting is conducted according to the following equation:

$$y(n)=x_i(n)s_1(n)+x_q(n)s_2(n)$$

where $s_1(n)$ is the signal {1,1,−1,−1, . . . } and $s_2(n)$ is the signal {−1,1,1,−1 . . . }, $x_i(n)$ is an in-phase component of the RF signal provided by said timing adjusting, and $x_q(n)$ is a quadrature component of the RF signal provided by said timing adjusting.

6. The method of claim 1, wherein the RF transmission frequency comprises a baseband RF transmission frequency.

7. The method of claim 6, wherein the second frequency is four times the RF transmission frequency and the first frequency is a substantially integral submultiple of the second frequency.

8. The method of claim 1, wherein said method is performed by a single integrated circuit.

9. The method of claim 1, wherein said method is performed by a CMOS integrated circuit.

10. The method of claim 1, further comprising amplifying and filtering the RF signal resulting from said band-pass delta-sigma converting.

11. The method of claim 10, wherein said amplifying uses a switching amplifier and said filtering is conducted subsequent to said amplifying.

12. The method of claim 11, further comprising modulating power to the switching amplifier.

13. The method of claim 12, wherein said filtering feeds back power associated with said out of band spectral components back to said switching amplifier.

14. The method of claim 1, wherein the output stream produced by said band-pass delta-sigma modulating is a single bit output stream.

15. The method of claim 1, wherein the output stream produced by said band-pass delta-sigma modulating is a multiple bit output stream.

16. A method for digital generation of RF signals at an RF transmission frequency, comprising:

up converting multi-bit digital representations of RF signals at an integrated circuit digital processing clock frequency to a multiple of the RF transmission frequency; and band-pass delta-sigma modulating, at the multiple of the RF transmission frequency, the digital representations of RF signals to produce an output bit stream including the analog content of the RF signals.

17. The method according to claim 16, wherein the multiple of the RF transmission frequency is four times a baseband frequency of RF transmission.

18. An integrated signal processing circuit for RF signal production, the circuit comprising:

digital processing means for producing digitally represented multi-bit in-phase and quadrature signals at a processing circuit clock frequency and timing adjusting the multi-bit in-phase and quadrature signals to a first RF frequency;

means for up converting the digitally represented multi-bit in-phase and quadrature signals to a second RF frequency; and band-pass delta-sigma modulator means for operating at the second frequency and producing an output bit stream representation of the digitally represented multi-bit in-phase and quadrature signals.

19. A wireless device comprising:

an integrated signal processing circuit for RF signal production, the circuit comprising:

digital processor means for producing digitally represented multi-bit in-phase and quadrature signals at a processing circuit clock frequency and timing adjusting the multi-bit in-phase and quadrature signals to a first RF frequency;

means for up converting the digitally represented multi-bit in-phase and quadrature signals to a second RF frequency; and band-pass delta-sigma modulator means for operating at the second frequency and producing an output bit stream representation of the digitally represented multi-bit in-phase and quadrature signals, wherein the output bit steam is a single bit resolution bit stream;

means for amplifying the single bit resolution bit stream; and filter means for attenuating out of band components from the output of the switching power amplifier.

20. The wireless device of claim 19, wherein said integrated signal processing circuit comprises an integrated CMOS circuit.

21. The wireless device of claim 19, wherein said means for up converting is digital.

22. The wireless device of claim 19, further comprising:

an antenna coupled to said filter means to broadcast signals filtered by said filter means.

23. The wireless device of claim 22, further comprising:

a duplexer coupled to said filter means and said antenna.

24. A wireless device comprising:

a receiver; and a transmitter comprising:

a switching power amplifier;

a filter to remove out of band components from the output of the switching power amplifier;

an antenna coupled to the filter; and an integrated signal processing coupled to the switching power amplifier, the circuit comprising:

a processor circuit to produce digitally represented multi-bit in-phase and quadrature signals at a processing circuit clock frequency, and to timing adjust the digitally represented multi-bit in-phase and quadrature signals to a first RF frequency;

an up converter to convert the digitally represented multi-bit in-phase and quadrature signals to up-converted in-phase and quadrature signals of a second RF frequency; and a band-pass delta-sigma modulator to output to the switching power amplifier a single bit resolution bit stream representation of the up-converted multi-bit in-phase and quadrature signals.

25. The wireless device of claim 24, wherein the wireless device is configured to operate in the cellular band.

26. The wireless device of claim 24, wherein the wireless device is configured to output CDMA signals.

* * * * *

UNITED STATES PATENT AND TRADEMARK OFFICE

CERTIFICATE OF CORRECTION

PATENT NO. : 7,953,174 B2
APPLICATION NO. : 10/392290
DATED : May 31, 2011
INVENTOR(S) : Asbeck et al.

It is certified that error appears in the above-identified patent and that said Letters Patent is hereby corrected as shown below:

Title page, item (56), under “Other Publications”, in Column 2, Line 7, delete “IEEE” and insert -- IEEE Microwave --.

Column 8, line 13, in Claim 19, delete “bit steam” and insert -- bit stream --.

Signed and Sealed this
Third Day of July, 2012

David J. Kappos
*Director of the United States Patent and Trademark Office*